(12) United States Patent
Montalban

(10) Patent No.: US 10,928,650 B2
(45) Date of Patent: Feb. 23, 2021

(54) ELASTIC HINGE FOR THE PLASTIC FRAME OF EYEGLASSES AND METHOD FOR ASSEMBLING SAID ELASTIC HINGE TO THE EYEGLASS FRAME

(71) Applicant: VISOTTICA INDUSTRIE S.p.A., Susegana (IT)

(72) Inventor: Rinaldo Montalban, Venice (IT)

(73) Assignee: VISOTTICA INDUSTRIE S.p.A., Susegana (IT)

( * ) Notice: Subject to any disclaimer, the term of this patent is extended or adjusted under 35 U.S.C. 154(b) by 119 days.

(21) Appl. No.: 16/262,941

(22) Filed: Jan. 31, 2019

(65) Prior Publication Data

US 2019/0243160 A1    Aug. 8, 2019

(30) Foreign Application Priority Data

Feb. 2, 2018    (IT) ......................... 102018000002345

(51) Int. Cl.
*G02C 5/22*    (2006.01)
*G02C 5/00*    (2006.01)

(52) U.S. Cl.
CPC .......... *G02C 5/2227* (2013.01); *G02C 5/006* (2013.01); *G02C 5/008* (2013.01); *G02C 5/2236* (2013.01); *G02C 2200/04* (2013.01); *G02C 2200/06* (2013.01); *G02C 2200/30* (2013.01)

(58) Field of Classification Search
CPC .. G02C 5/2236; G02C 5/2245; G02C 5/2254; G02C 5/2227

USPC ............................................. 351/153; 16/228
See application file for complete search history.

(56) References Cited

U.S. PATENT DOCUMENTS

| 6,152,562 A | 11/2000 | Montalban |
| 2001/0038436 A1 | 11/2001 | Schuchard et al. |
| 2002/0092960 A1* | 7/2002 | Hotellier .............. G02C 5/2236 248/560 |

FOREIGN PATENT DOCUMENTS

| CN | 106405866 | 2/2017 |
| EP | 1090324 | 4/2001 |
| GB | 2248121 | 3/1992 |
| IT | PD2015A000050 | 2/2015 |
| WO | 2007107474 | 9/2007 |

* cited by examiner

*Primary Examiner* — Darryl J Collins
(74) *Attorney, Agent, or Firm* — Mark M. Friedman

(57) ABSTRACT

Elastic hinge for plastic frames of eyeglasses, which comprises a first and a second articulation element respectively associable with a first and a second component of eyeglasses. The first articulation element comprises a male element which is susceptible of sliding inside a seat of the first component and comprises a head portion, a rod-like portion fixed to the head portion, an anchorage body slidably coupled to the rod-like portion and provided with a retention portion provided with anchorage elements. The first articulation element also comprises an expander body adapted to interfere with the anchorage body in order to externally expand the retention portion of the latter towards the internal wall of the seat so as to engage the anchorage elements of the retention body with the first component of the eyeglasses.

11 Claims, 14 Drawing Sheets

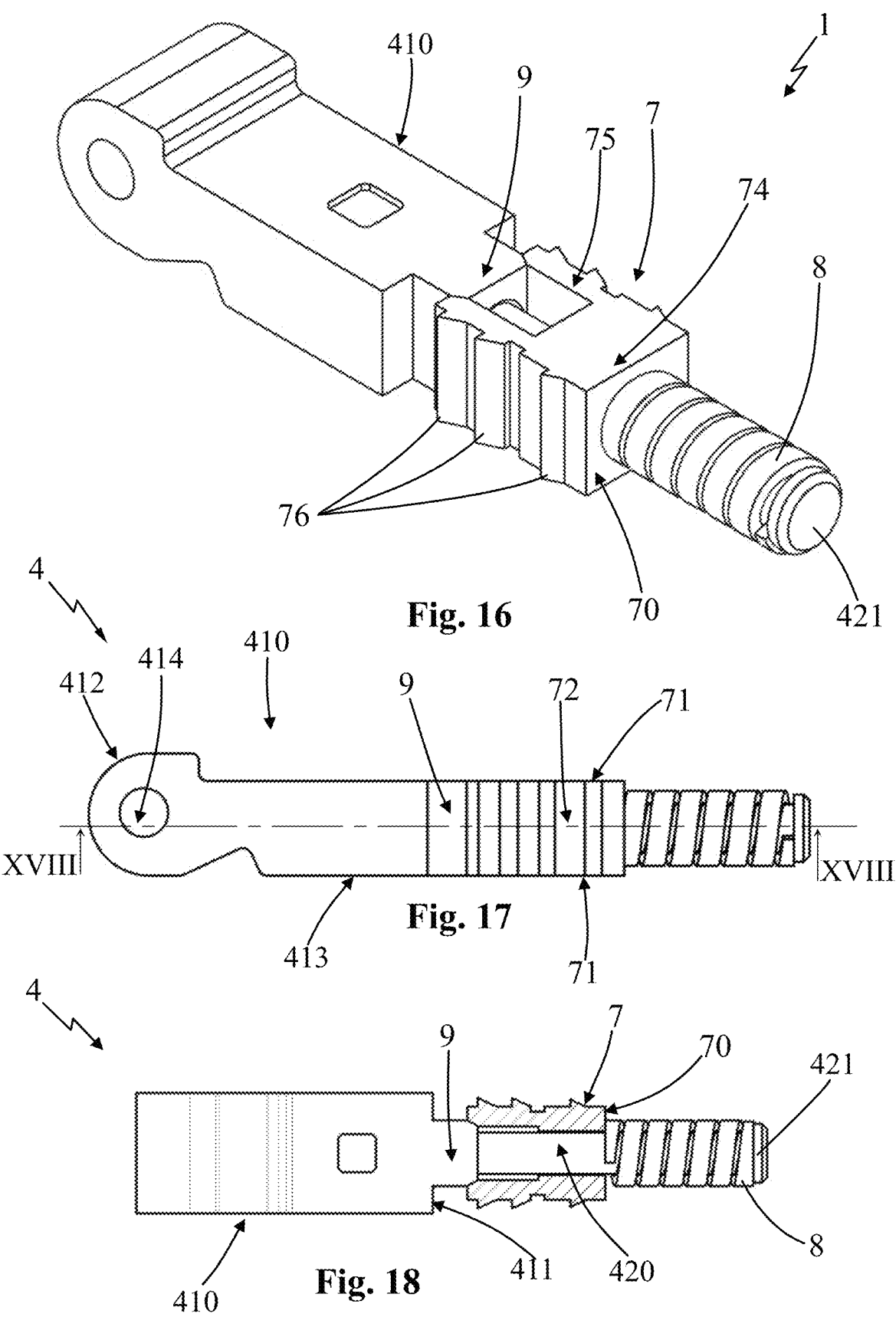

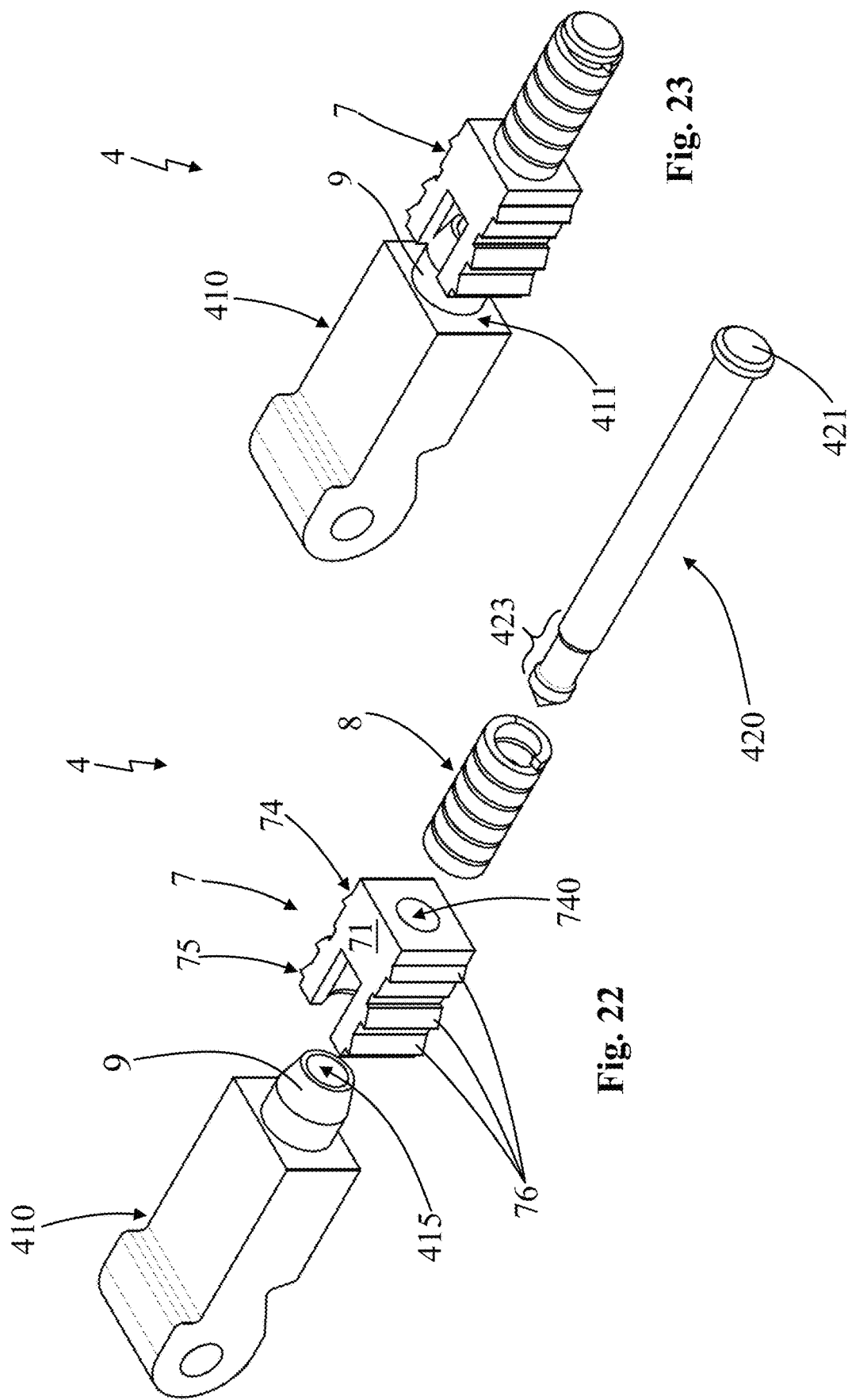

ELASTIC HINGE FOR THE PLASTIC FRAME OF EYEGLASSES AND METHOD FOR ASSEMBLING SAID ELASTIC HINGE TO THE EYEGLASS FRAME

FIELD OF APPLICATION

The present invention regards an elastic hinge for the plastic frame of eyeglasses and a method for the assembly of said elastic hinge to the eyeglass frame.

The present elastic hinge is advantageously intended to be employed in the production of plastic frames for eyeglasses and in particular it is susceptible of being used in processes for producing frames by means of 3D printing, in which the hinge is embedded within the same frames.

Therefore, the hinge, object of the present invention, is inserted in the industrial field of eyeglasses, i.e. of production of eyeglasses and of accessories and components for eyeglasses.

STATE OF THE ART

Conventionally, in the eyeglass field, hinges are employed for articulating the temples to the front of a frame.

Each hinge is usually formed by two articulation elements, pivoted together, of which respectively a first element is fixed to a temple and a second element is fixed to a lateral portion of the front of the frame (also known, in the technical jargon of the field, with the term "end piece").

In operation, the hinges allow the temples to rotate between a closed position, in which they are collected on the front of the eyeglasses, and an open position, in which they take on a substantially right-angle position with respect to the front adapted to allow the use thereof on the face of the user.

In particular, the present invention refers to hinges of known type, so-called "elastic" hinges, i.e. to hinges that allow moving the temples between the aforesaid positions by overcoming an opposing force exerted by an elastic device associated with the hinge.

The elastic hinges allow the temples to also reach a further position, which is situated beyond the open position and which allows the user to more comfortably put on the eyeglasses. Once the eyeglasses have been put on, the temples can be released on the head of the user in order to exert a slight pressure thereon. Such slight pressure allows the temples to be firmly adhered to the head, ensuring a better fit of the eyeglasses in many use conditions.

More in detail, elastic hinges are known, for example from the patent application IT2015PD00050, which comprise a box-like body that is inserted with pressure in a seat made in the temple so as to create a coupling via anchorage between the provided retention elements externally projecting from the box-like body and the same plastic material constituting the temple.

Such anchorage elements ensure the mechanical retention of the box-like body within the seat made in the temple.

Also known are frames for eyeglasses attained by means of three-dimensional printing processes starting from plastic materials such as: acrylonitrile butadiene styrene (ABS), acrylonitrile styrene acrylate (ASA), polycarbonate (PC), polycarbonate acrylonitrile butadiene styrene (PC-ABS), nylon, carbon fiber filled nylon (Nylon CF) or even liquid resins such as photopolymers and resins for laser stereography. The main drawback of the polymer resins usable in the three-dimensional printing processes is that they do not have the mechanical characteristic of elastic return with values comparable to those of the materials conventionally employed in the eyeglass field, such as acetate. The reduced elastic return of such plastic materials employable for three-dimensional printing has the drawback of not allowing elastic hinges to be firmly anchored to the temple.

In other words, and more clearly, the externally projecting retention elements of the box-like body of the elastic hinges, when the latter is inserted in the seat of the temple, drag along the walls of the seat, moving the plastic material that defines it and permanently deforming the shape of the same seat. Such circumstance prevents the externally projecting retention elements from exerting their action of anchoring on the surface of the seat, since there is no more plastic material on which they can grip.

Therefore, an important drawback of the elastic hinges which provide for the forced engagement of the box-like bodies in the seats of the temples is to not be able to ensure a satisfactory mechanical engagement if the temples were obtained with the three-dimensional printing technique, given the poor elasticity of the plastics employed in the same three-dimensional printing technique.

In addition, a further drawback that is encountered for the elastic hinges intended to be mounted on temples obtained with the three-dimensional printing technique lies in the fact that such production technique involves imprecision in the production of the temples, i.e. it requires very high size tolerances which are poorly suited for mounting elastic hinges on such temples that instead require very low tolerances in order to ensure an optimal mechanical retention.

Associating the box-like body of a elastic hinge made of steel with great procession with a seat of a plastic temple made with high and variable tolerances does not allow a secure anchorage.

In practice, that which is obtained by using embedded hinges of known type with plastics intended for production processes with three-dimensional printers is the opposite of what is desired, i.e.: a difficult insertion of the hinge and an easy extraction thereof, given the absence of the coupling elements that were drawn during the insertion.

PRESENTATION OF THE INVENTION

In this situation, the problem underlying the present invention is that of eliminating the drawbacks of the above-mentioned prior art, by providing an elastic hinge for the plastic frame of eyeglasses which also allows being mounted on frames for eyeglasses attained with three-dimensional printing process, ensuring an optimal anchoring of the articulation elements of the hinge to the same frame.

A further object of the present invention is to provide an elastic hinge for the plastic frame of eyeglasses which is easy and quick to install.

A further object of the present invention is to provide an elastic hinge for the plastic frame of eyeglasses which is structurally simple, and entirely reliable in operation.

A further object of the present invention is to provide a method for the assembly of an elastic hinge to the eyeglass frame which can be executed even in the case of frames attained with three-dimensional printing processes, ensuring an optimal anchoring of the articulation elements of the hinge to the same frame.

BRIEF DESCRIPTION OF THE DRAWINGS

The technical characteristics of the finding, according to the aforesaid objects, can be clearly seen in the contents of the below-reported claims and the advantages thereof will be more evident from the following detailed description, made with reference to the enclosed drawings, which represent several merely exemplifying and non-limiting embodiments of the invention, in which:

FIG. 16 shows a perspective view of a detail of the elastic hinge for the plastic frame of eyeglasses according to the present invention, relative to the first articulation element, in accordance with a third embodiment;

FIG. 17 shows a side view of the first articulation element of FIG. 16;

FIG. 18 shows a partially sectional view of the assembly of FIG. 16 according to the trace XVIII-XVIII of FIG. 17;

FIG. 22 shows an exploded perspective view of a detail of the elastic hinge for the plastic frame of eyeglasses according to the present invention, relative to the first articulation element, in accordance with a fourth embodiment;

FIG. 23 shows the detail of FIG. 22 in a perspective view with the parts assembled;

DETAILED DESCRIPTION OF A PREFERRED EMBODIMENT

Figure 1:
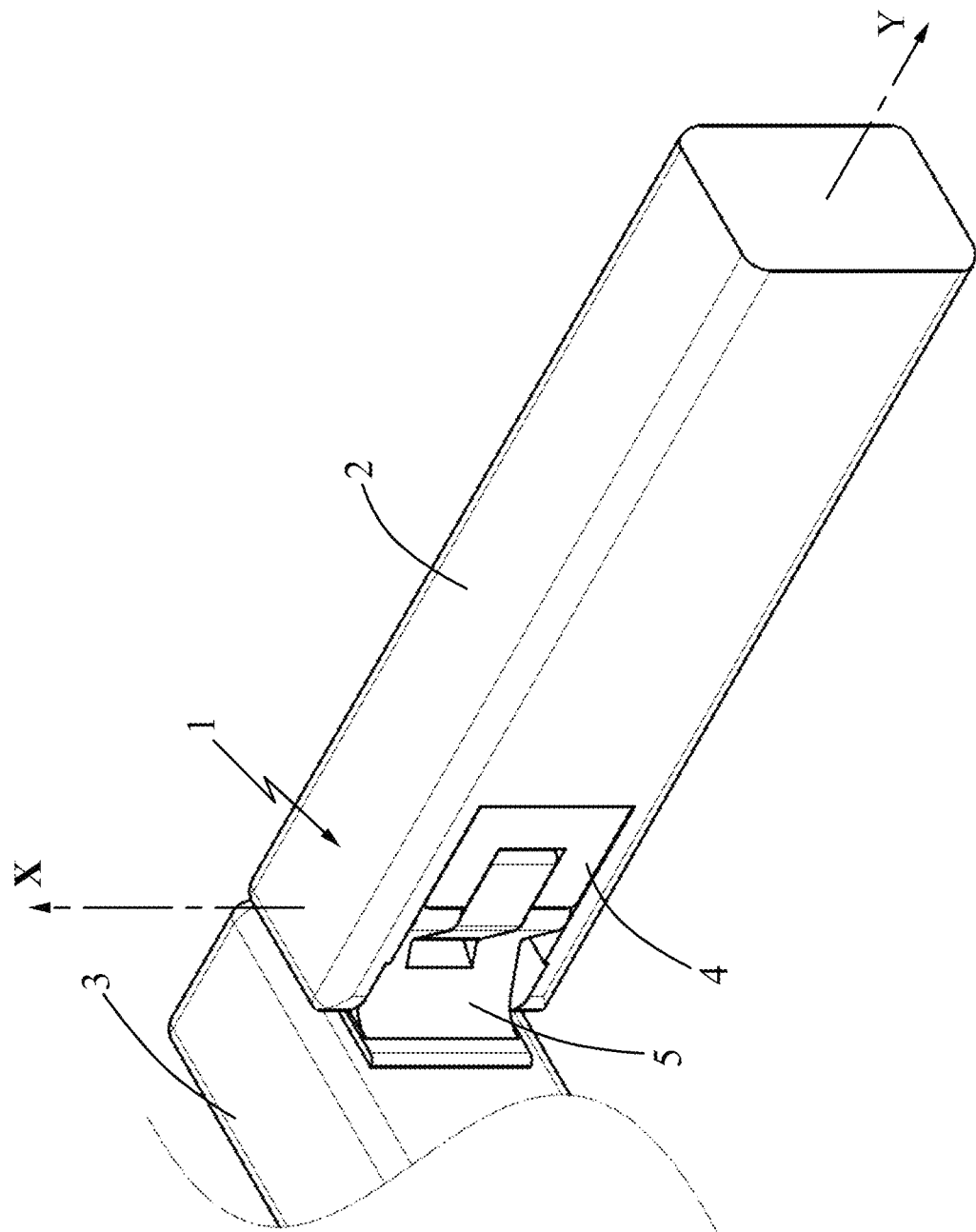
FIG. 1 shows an elastic hinge for plastic frames of eyeglasses according to the present invention mounted to connect a temple and a front of a frame, illustrated only in part and with the temple in open position.

With reference to the enclosed drawings, reference number 1 overall indicates the elastic hinge for the plastic frame of eyeglasses, object of the present invention.

The elastic hinge 1, according to the present invention, is intended for making frames for eyeglasses of both conventional and sport type and is adapted in a per se known manner to mutually articulate a temple 2 together with an end piece 3 of a frame for eyeglasses.

More in detail, the elastic hinge 1 according to the invention can be employed on a frame made of plastic, for example of a cellulose resin such as cellulose acetate, Optyl, polyamide, Nylon and polycarbonate or also advantageously plastic materials used in three-dimensional printing processes.

The frame itself is not however the object of a specific claim and hence it will be described only briefly hereinbelow, given that its main structural principles are well known to a man skilled in the art.

More in detail, the frame is advantageously formed, in an entirely conventional manner, by a front, which supports a pair of lenses, connected in the central part by a bridge, susceptible of resting on the nose of the user, and by a pair of temples 2 pivoted by means of elastic hinges 1 to the sides of the front and, more precisely, to two lateral portions thereof directed towards the rear part of the eyeglasses and known in the technical jargon of the field with the term end piece 3.

In particular, the hinge 1 according to the present invention is of elasticized type, i.e. adapted to allow an over-travel during opening of the temples 2 with elastic return aimed to allow easily putting on the eyeglasses and aimed to ensure an improved fit of the same once worn on the head of the user.

In operation, the temples 2 can be moved, due to the aforesaid elastic hinges 1, in a per se entirely conventional manner, between a closed position, in which they are collected on the front of the eyeglasses, an open position, in which they assume a substantially right-angle position with respect to the front of the eyeglasses, and an over-travel position, in which they are forced beyond the aforesaid open position.

The elastic hinge 1 comprises, in a per se entirely conventional manner, two articulation elements, of which a first articulation element 4 is mechanically engageable in a seat 100 made in a first plastic component of eyeglasses, which in particular in accordance with the example of the enclosed figures is constituted by a temple 2 of the frame, and a second articulation element 5 is mechanically associable with a second component of eyeglasses, which in particular in accordance with the example of the enclosed figures is constituted by the front 3 of the frame. Hereinbelow reference will be made to the preferred solution of the enclosed figures in which the first plastic component of the frame is in fact constituted by a temple 2 and the second plastic component is constituted by the end piece 3 of the frame; nevertheless embodiments can be provided where the two components are reversed without departing from the protective scope of the present patent.

The seat 100 is made longitudinally in the temple 2 in its plastic matrix, starting from a front face 20 thereof maintained in abutment against a rear face 30 of the end piece 3 by an elastic element 8 described hereinbelow.

Advantageously the seat 100 identifies a bottom surface 103, two substantially vertical lateral surfaces 104 and two horizontal surfaces 105 placed to connect the lateral surfaces 104.

The second articulation element 5 is for example obtained in an entirely conventional manner with two parallel shoulders fixed to the end piece of the eyeglasses (e.g. made integrally in the plastic of the end piece) by means of a common base and provided with facing holes for the insertion of a pin 6.

The first articulation element 4 is preferably made of metal, while the second articulation element 5 is, in this specific embodiment variant, integrally made in the plastic material of the end piece 3, and therefore is in a single body with the latter. However nothing prevents being able to provide for the second articulation element 5 as a separate element made of metal material, which will then be embedded in the plastic end piece 3 of the eyeglasses. First and second articulation element 4 and 5 are then mutually pivoted to each other by means of the hinge pin 6 with axis X transverse, with respect to the main extension axis Y of the temple 2, e.g. constituted by a screw.

The second articulation element 5 is then rotatably coupled to the first articulation element 4 in an entirely conventional manner by means of a hinge pin indicated with 6.

More in detail, in accordance with the general and per se known characteristics of an elastic hinge 1, the first articulation element 4 comprises a male element 40, susceptible of sliding in the seat 100 of the temple 2 and provided with main extension according to an axis Y substantially parallel to that of the temple 2.

The movable male element 40 is provided with a head portion 410, and with a rod-like portion 420.

The head portion 410 is susceptible of being extended at least partially outside the seat 100 of the temple 2 in order to allow such head portion 410, to be rotatably coupled by means of the pin 6 to the second articulation element 5.

More in detail, advantageously the head portion 410 identifies two portions, an externally projecting portion 412 and a neck portion 413.

The externally projecting portion 412 of the head portion 410 is extended partly outside the seat 100 of the temple 2, and is provided with an eyelet 414, intended to be rotatably coupled by means of the pin 6 to the second articulation element 5.

The neck portion 413 of the head portion 410, intended to be inserted within the seat 100, is preferably shaped with a prismatic shape and is at least partially insertable in a guided manner in a corresponding portion of the seat 100 of the temple 2.

The neck portion 413 of the head portion 410 advantageously has parallelepiped shape susceptible of being slidably engaged in the corresponding portion of the seat 100 of the temple 2 along the longitudinal axis Y; by means of such shape engagement, rotations around such longitudinal axis Y of the male element 40 in the seat 100 are prevented. Clearly, nothing prevents the section of the neck portion 413 and of the relative portion of the seat 100 from having a polygonal shape, curvilinear shape or other shapes that can ensure a shape engagement which prevents relative undesired rotations around the axis Y.

The rod-like portion 420 of the male element 40 is susceptible of being inserted within the terminal portion 102 of the seat 100 of the temple 2 and is projectingly extended to the rear of the head portion 410 from its rear face 411 up to the enlarged termination 421. Such termination is advantageously enlarged with respect to the diameter of the remaining rod-like portion 420 due to a termination element for example constituted by the head of a screw.

The head portion 410 and the rod-like portion 420 of the male element 40 are mechanically and rigidly connected to each other.

In particular the rod-like portion 420 is fixed to the rear of the neck portion 413 of the head portion 410 of the movable male element 40.

The rigid mechanical connection present between the rod-like portion 420 and the head portion 410 of the male element 40 can be obtained by fixing an initial section 423 of the rod-like portion 420, opposite the enlarged termination 421, in a blind hole 415 made on the rear face 411 of the head portion 410 of the movable male element 40.

Advantageously, the aforesaid initial section 423 of the rod-like portion 420 is inserted in the blind hole 415 made on the rear face 411 of the head portion 410 and is retained at its interior by means of plastic deformation of one or more small portions of material on the head portion 410. Such crimping deformation bears the same material portion inside an annular depression provided in the aforesaid initial section 423 of the rod-like portion 420, e.g. made by means of punching, thus interfering with such initial section 423 via axial movements, along the axis Y, that are relative between the two portions 410 and 420 of the movable male element 40.

Otherwise, the initial section 423 of the rod-like portion 420 can be mechanically fixed in the blind hole 415 made on the rear face 411 of the head portion 410 by means of screwing, thus avoiding the operation of crimping plastic deformation.

Alternatively, it is also possible to provide for the two portions 410 and 420 of the movable male element 40 made as a single component, in this case then coming to rivet the free termination of the rod-like portion 420 in order to create the enlarged termination 421 and thus preventing difficult junction operations between the two components 410 and 420.

Advantageously the enlarged termination 421 is obtained by means of the head of a screw screwed in the rod-like portion 420 of the movable male element 40.

Otherwise the enlarged termination 421 is obtained by means of beating of the rod-like portion 420 of the movable male element 40.

The first articulation element 4 also comprises an anchorage body 7 provided with a guide portion 74, e.g. provided with a through hole 740, slidably coupled to the rod-like portion 420, which advantageously traverses the aforesaid through hole 740.

Such through hole is for example substantially circular and is intended to be slidably coupled with the rod-like portion 420 of the movable male element 40 of the first articulation element 4.

Therefore, the rod-like portion 420 of the movable male element 40 is moved, slidably guided with precision within the guide portion 74 of the anchorage body 7.

Advantageously the guide portion 74 of the anchorage body 7 has substantially parallelepiped shape and is provided with a rear surface 70 substantially directed towards the bottom surface 103 of the seat 100 made on the temple 2 of two substantially parallel lateral surfaces 71 (and vertical in the normal use position of the eyeglasses), with two surfaces 72 of connection between the aforesaid lateral surfaces 71 that are substantially parallel (and horizontal in the normal use position of the eyeglasses) and with a front surface 73 substantially directed towards the head portion 410 of the movable male element 40.

The parallelepiped shape of the guide portion 74 of the anchorage body 7 allows preventing the relative rotations between the seat 100 and the anchorage body 7 itself around the main axis Y of the temple 2.

The first articulation element 4 also comprises an elastic element 8 interposed between the enlarged termination 421 of the rod-like portion 420 and the anchorage body 7 between which it is abuttingly compressed.

In accordance with the idea underlying the present invention, the anchorage body 7 also comprises at least one retention portion 75, which is projectingly extended from the guide portion 74 towards the head portion 410 of the male element 40 and is provided with anchorage elements 76 susceptible of being engaged by means of retention relationship with the internal wall of the seat 100 of the temple 2.

In addition, the first articulation element 4 comprises an expander body 9 interposed between the head portion 410 of the male element 40 and the anchorage body 7 and susceptible of sliding along the rod-like portion 420 starting from a non-operative position A, in which it does not interfere with the anchorage body 7 up to reaching an operative position B, in which it interferes with the retention portion 75 of the anchorage body 7, expanding such retention portion 75 externally towards the internal wall of the seat 100 in order to engage the anchorage elements 76 of the retention body 75 of the anchorage body 7 to the first plastic component of the eyeglasses.

Structurally, the retention portion 75 of the anchorage body 7 is pushed by the expander body 9 towards the exterior of the axis of the rod-like portion 420 so as to be susceptible of being engaged in the plastic material that forms the temple 2. Such condition of the elastic hinge 1 is susceptible of being attained following a sliding of the expander body 9 with respect to the retention portion 75 of the anchorage body 7 which brings it to being wedged in the retention portion, widening it.

Advantageously the expander body 9 is also provided with a through hole traversed by the rod-like element 420 of the movable male element 40.

The anchorage elements 76 which are engaged in retention relationship with the internal surfaces of the seat 100 preferably act on its horizontal surfaces 105.

Advantageously also the guide portion 74 of the anchorage body 7 is provided, on its two connection surfaces 72, with anchorage elements 76 which are thus susceptible of being engaged in retention relationship in the seat 100 of the temple 2, and in particular in the horizontal surfaces 105 of the aforesaid seat 100.

The penetration of the anchorage elements 76 in the material of the temple 2, starting from the internal surface of the seat 100, occurs through a radial or transverse expansion with respect to the axis of the rod-like portion 420 of the male element 40. This allows, following the insertion of the first articulation element 4 in the temple 2, the anchorage elements 76 to be engaged in the material of the temple 2 that up to that moment has not sustained deformations.

More in detail, such anchorage elements 76 are intended to penetrate within the material constituting the temple 2 and creating, by means of expansion, a housing.

Otherwise, in accordance with a further embodiment not represented in the enclosed figures, the lateral internal surfaces 104 of the seat 100 comprise projections forming at least one undercut portion with the horizontal surfaces 105 of the seat 100 itself. The anchorage elements 76 are in this case intended to be engaged in a shape relationship with the undercut portion without penetrating within the material constituting the temple.

In accordance with the embodiments shown in the enclosed figures, the retention portion 75 consists of two first flexible projecting wings 751, as described above, substantially parallel to the connection surfaces 72 of the anchorage body 7.

Advantageously, therefore, the engagement of the expander body 9 with the anchorage body 7 allows maintaining the first flexible projecting wings 751 of the retention portion 75 externally expanded and anchored to the internal walls of the seat 100 of the temple 2. This technical solution allows obtaining a considerable improvement in the secure nature of the anchoring of the anchorage body 7 to the temple 2 and consequently of the entire elastic hinge 1.

Advantageously, the retention portion 75 (and in particular the first wings 751) of the anchorage body 7 is provided with an internal surface 752 directed towards the axis Y and against which the expander element 9 acts in radial thrust (with respect to the axis Y) when it is in the operative position B. In particular, such internal surface 752 defines a space in which the expander element 9 is partially inserted in operative position B. Preferably, the expander element 9 thrusts against the internal surface 752 of the retention portion 75, pushing the latter (and in particular its first wings 751) radially away from the axis Y (and from the rod-like portion 420) in order to press the anchorage elements 76 of the retention portion 75 against the internal wall of the seat 100 of the first plastic component 2 of the eyeglasses.

In accordance with the embodiment illustrated in the enclosed figures, the retention portion 75 of the anchorage body 7 comprises at least two first flexible wings 751 having the anchorage elements 76 externally associated therewith. Such first wings 751 have the internal surface shaped with cylindrical sector in order to be better coupled with a corresponding preferably wedge-shaped form of the expander body 9.

The elastic element 8 is preferably constituted by a helical spring, coaxially mounted around the rod-like portion 420 of the movable male element 40 and operatively interposed between the enlarged termination 421 of the rod-like portion 420 and the rear face 70 of the guide portion 74.

Advantageously, for such purpose the elastic element 8 has a transverse size larger than that of the rod-like portion 420 and that of the through hole 740 made on the guide portion 74 of the anchorage body 7, and smaller than that of the enlarged termination 421 of the rod-like portion 420.

Due to such characteristic presented by the transverse size of the elastic element 8, the latter is susceptible of abutting against the enlarged termination 421 and against the rear surface 70 of the guide element 74.

The action of the elastic element 8 is aimed to maintain the anchorage body 7 thrust towards the head portion 410 of the movable male element 40.

In operation, when the temples 2 are moved in rotation around the pin 6, between the closed position and the open position or over-travel position, there is the partial exit of the movable male element 40 from the seat 100 of the temple 2, overcoming the reaction force of the elastic element 8. In order to reach the open and over-travel positions, the temple 2 is abutted with its front face 20 against the edges of the rear face 30 of the end piece 3, moving the position of the transverse axis X of the pin 6 away from the seat 100 of the temple 2, and then forcing the male element 40 to exit from the seat 100 against the action of the elastic element 8.

In operation, with the expander body 9 in operative position B, the second flexible projecting wings 94 are expanded externally towards the internal surfaces of the seat 100.

The expander body 9 defines a front wall 91, directed towards the head portion 410 of the male element 40 against which it is intended to abut against in operative position B. More in detail, the front wall 91 of the expander body 9 is intended to contact the rear face 411 of the head portion 410.

In accordance with the embodiment illustrated in the enclosed FIGS. 16 to 29, the expander body 9 is in a single body with the head portion 410 of the male element 40 of the first articulation element 4.

Otherwise, in accordance with the embodiment illustrated in the enclosed FIGS. 2 to 15, the expander body 9 is an element separated from the head portion 410 of the male element 40.

In accordance with the latter embodiment, the expander body 9 comprises an annular body 93 facing the head portion 410 of the male element 40 of the first articulation element 4 and two or more second flexible wings 94, each of which projectingly extended from the annular body 93, in opposite direction with respect to the head portion 410. The second flexible wings 94 are provided with free ends with coupling teeth 92, radially directed outward, intended to be engaged by means of shape coupling in a shoulder 77 of the anchorage body 7, when the expander body 9 is arranged in the aforesaid operative position B.

In accordance with such embodiment the rod-like portion 420 of the male element 40 advantageously has an intermediate depression 425 susceptible of receiving, when the expander body 9 is arranged in an intermediate position between the non-operative position A and the operative position B, the free ends of the second flexible wings 94. In such a manner, the aforesaid free ends of the second flexible wings 94 can enter—when the expander body 9 slides towards the operative position B from the non-operative position A—within the through hole 740 provided in the guide portion 74 of the anchorage body 7, being elastically bent towards the axis of the rod-like portion 420 of the male element 40, pushed in such direction by the interference against the internal surface of such through hole 740 of the guide portion 74.

As soon as the coupling teeth 92 of the second flexible wings 94 reach the shoulder 77, in particular annular, of the anchorage body 7, i.e. upon substantially reaching the operative position B of the expansion body 9, they are outwardly expanded, being mechanically engaged with such the expansion body 9, and thus making the expansion body 9 and the anchorage body 7 integral with each other. In such position, as stated, the anchorage body 7 is anchored to the seat 100 of the temple 2 due to the expansion of the retention portion 75 with the anchorage elements 76 that are embedded in the material of the temple 2.

The anchorage elements 76 are advantageously constituted by pointed ribs with an orthogonal ridge directed towards the head of the male element 40 and with a tilted ridge partially directed towards the enlarged termination 421 of the male element 40.

Such tapered profile of the ribs towards the aforesaid enlarged termination 421 indicates that the anchorage body 7 is facilitated in entering the seat 100 of the temple 2 and is instead engaged, with respect to an outgoing movement from the seat of the temple, with such ribs in the plastic material of the same temple 2.

Advantageously, when the expander body 9 reaches the operative position B, the rod-like portion 420 of the male element 40, in the section subsequent to the intermediate depression 425 towards the enlarged termination 421, interferes with the second flexible wings 94 of the expander body 9, widening them in engagement towards the aforesaid shoulder 77 of the anchorage body 7. In such operative position B, the second flexible wings 94 of the expander body 9 are interposed as a sandwich between the rod-like portion 420 of the male element 40 and the internal surface of the through hole 740 of the anchorage body 7.

In the case of the embodiment in which the expander body 9 is obtained in a single body with the head portion 410 of the male element 40, or also in the case in which it is engageable by means of ribs which are engaged in the blind hole 415 provided in the head portion 410 of the male element 40, it is no longer necessary to anchor the expander body 9 to the retention body 7. Consequently, the expander body 9 is projectingly extended from the head portion of the male element 40 towards the enlarged termination 421 of the rod-like portion 420 with a final portion having wedge function and hence for example with substantially frustoconical shape, as illustrated in FIG. 22, or it can have substantially parallelepiped shape as illustrated in FIG. 16.

In accordance with both these two embodiments, the expander body 9 has an axial through hole traversed by the rod-like portion 420 of the male element 40.

Also forming the object of the present invention is a method for assembling the elastic hinge 1, as described above, to the eyeglass frame and of which, for the sake of description simplicity, the numerical references and nomenclature will be maintained.

The aforesaid method is employable for all the embodiments of elastic hinge 1 for the plastic frame of eyeglasses described up to now, with the purpose of fixing the elastic hinge 1, object of the present invention, to the eyeglass frame in a simple manner, by means of a pressure insertion of the elastic hinge 1 in the seat 100 made in the temple of a eyeglass frame.

Figure 2:
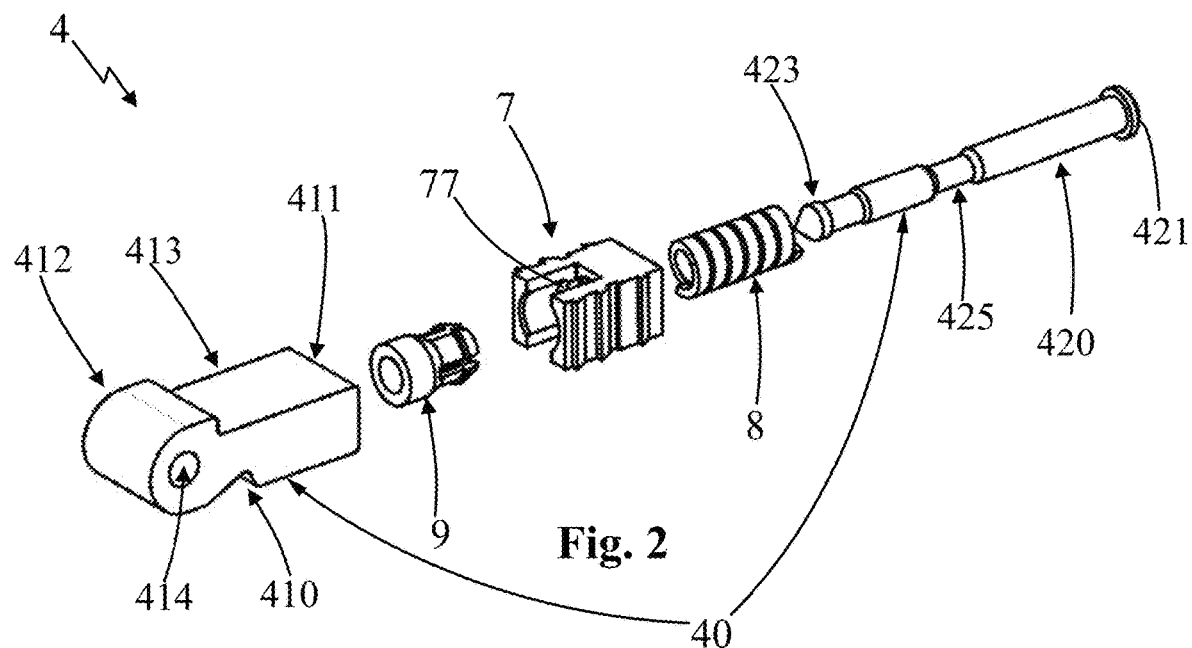
FIG. 2 shows an exploded view of a detail of the elastic hinge for the plastic frame of eyeglasses according to the present invention, relative to a first articulation element, in accordance with a first embodiment.
Figure 3:
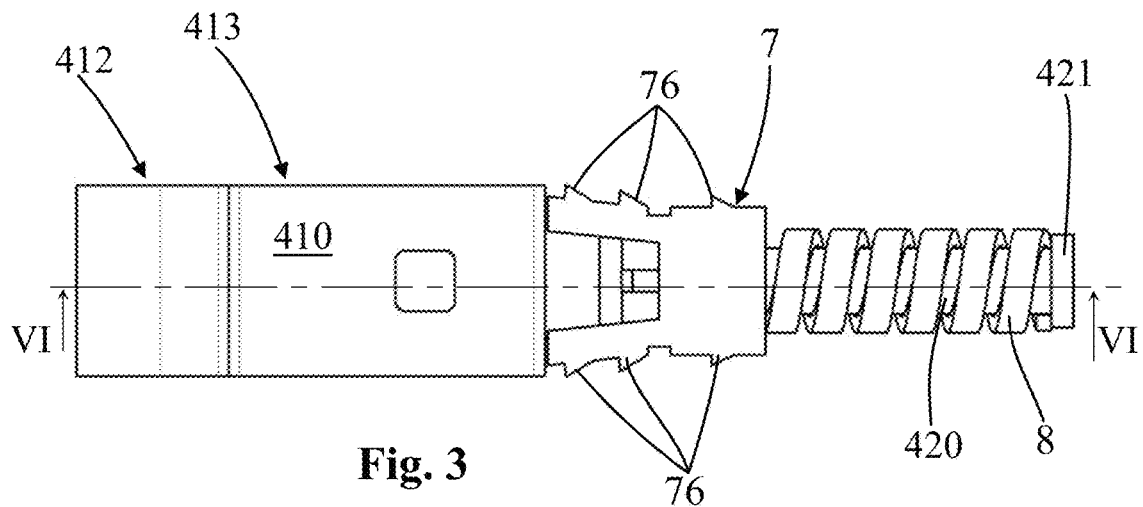
FIG. 3 shows a plan view of the first articulation element of FIG. 2.
Figure 4:
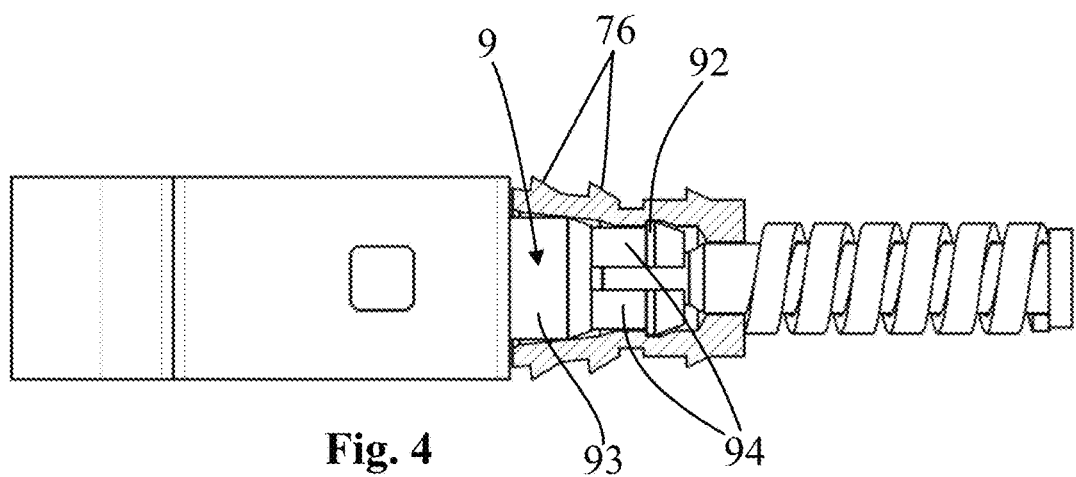
FIG. 4 shows a partially sectional view of the first articulation element of FIG. 3, carried out along the trace IV-IV of FIG. 3.
Figure 5:
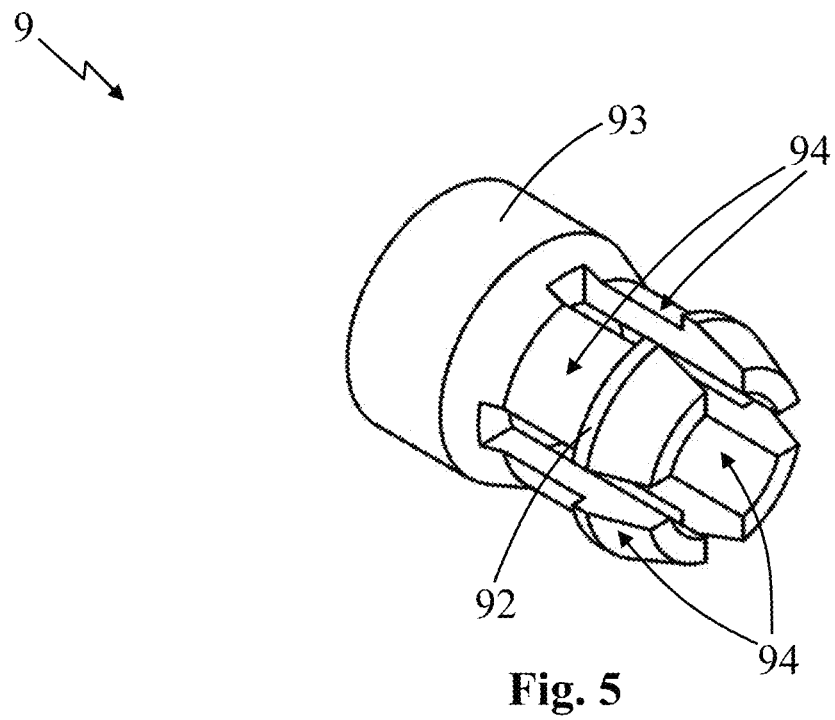
FIG. 5 shows a perspective view of a detail of the elastic hinge according to the present invention relative to an expander body.
Figure 6:
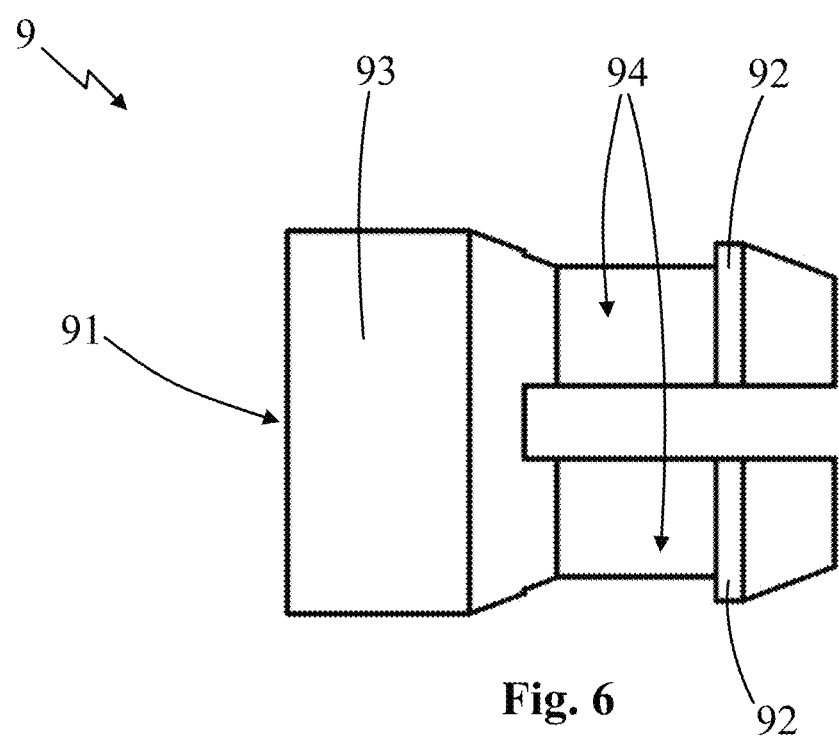
FIG. 6 shows a side view of the expander body of FIG. 5.
Figure 7:
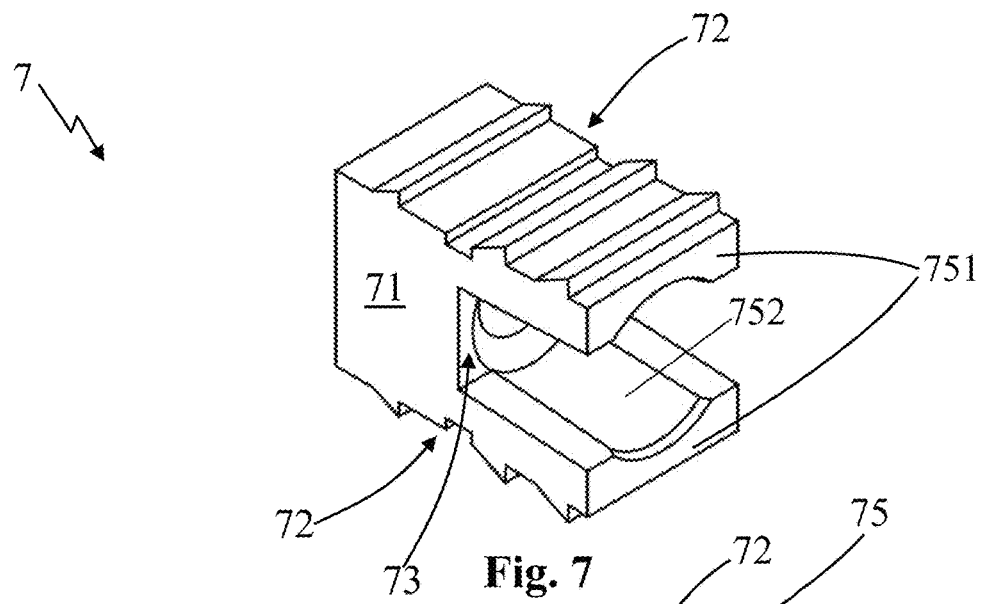
FIG. 7 shows a first perspective view of a detail of the elastic hinge according to the present invention relative to an anchorage body.
Figure 8:
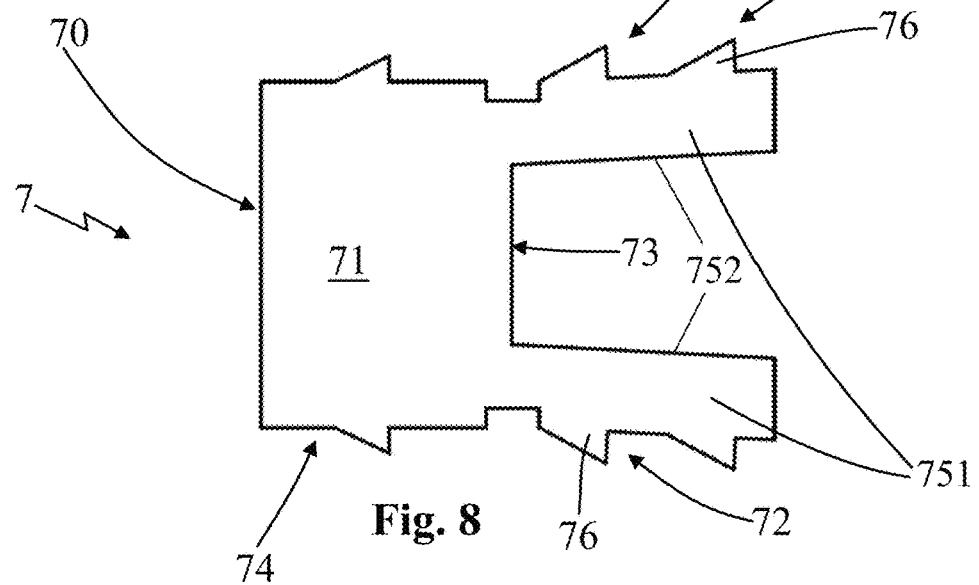
FIG. 8 shows a side view of the anchorage body of FIG. 7.
Figure 9:
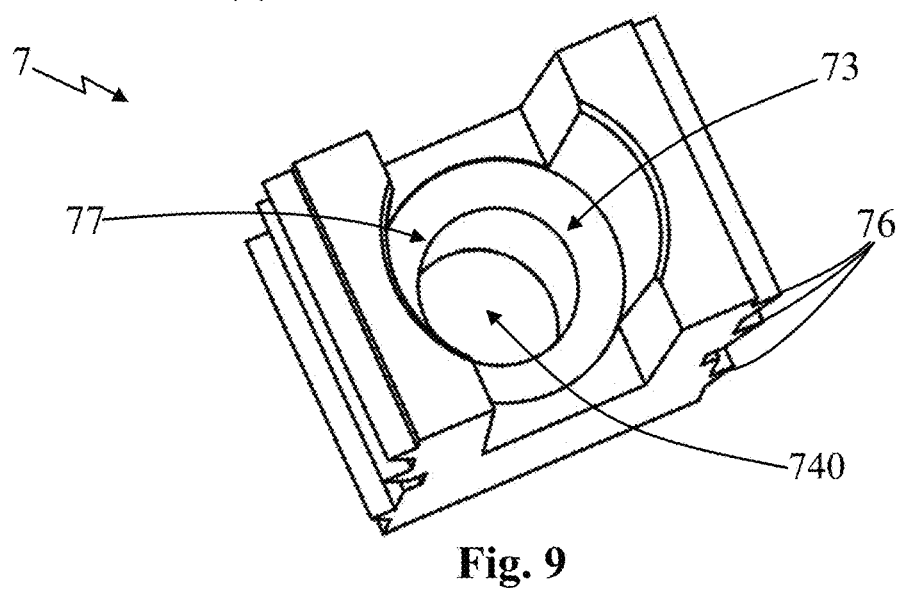
FIG. 9 shows a second perspective view of the anchorage body of FIG. 7.
Figure 10:
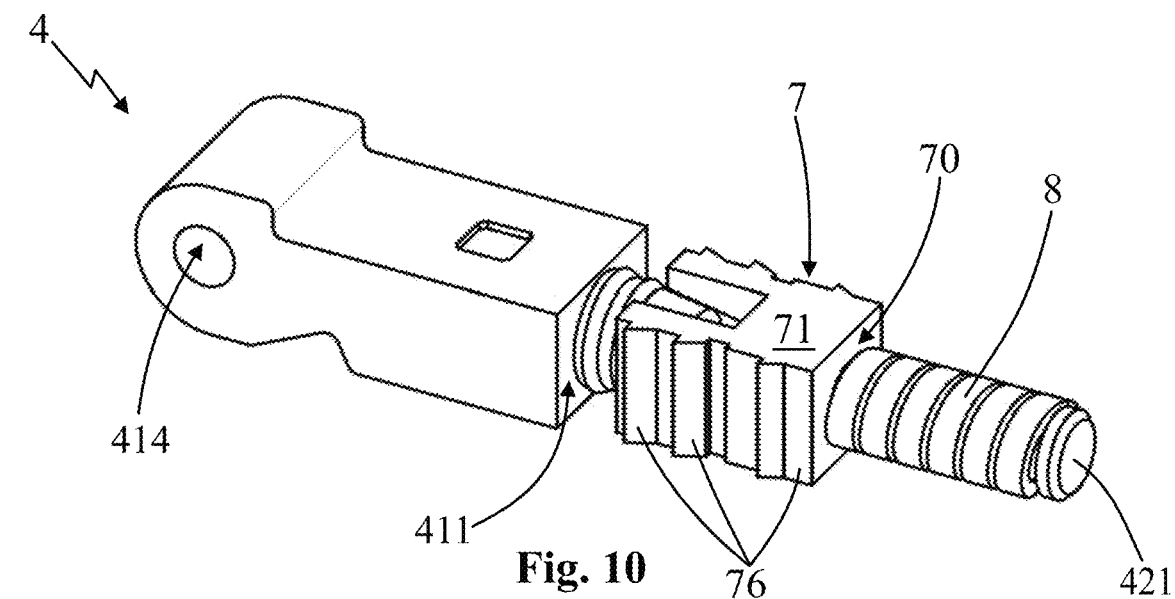
FIG. 10 shows a perspective view of a detail of the elastic hinge for the plastic frame of eyeglasses according to the present invention, relative to the first articulation element, in accordance with a second embodiment.
Figure 11:
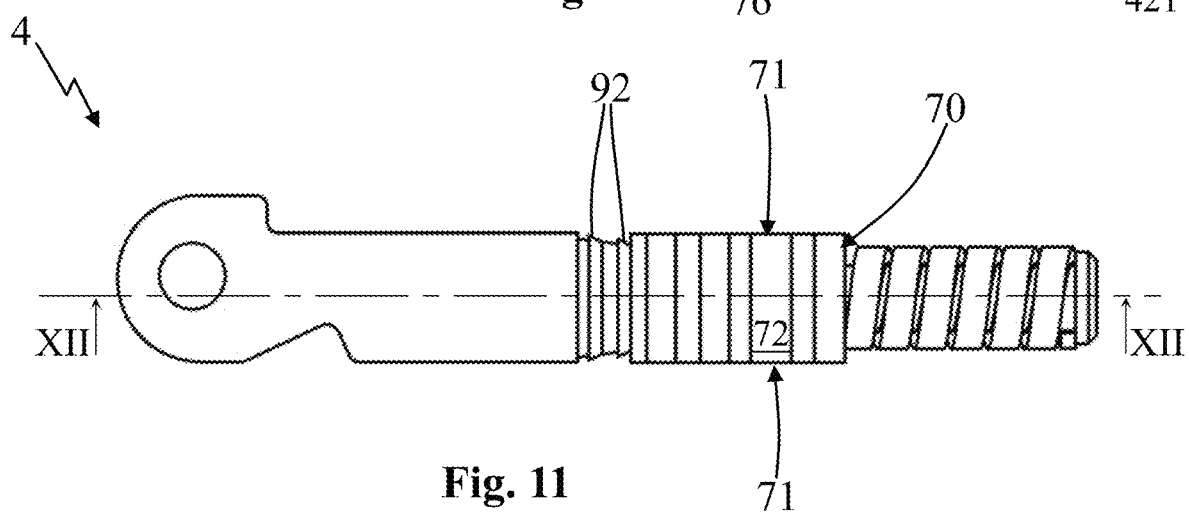
FIG. 11 shows a side view of the first articulation element of FIG. 10.
Figure 12:
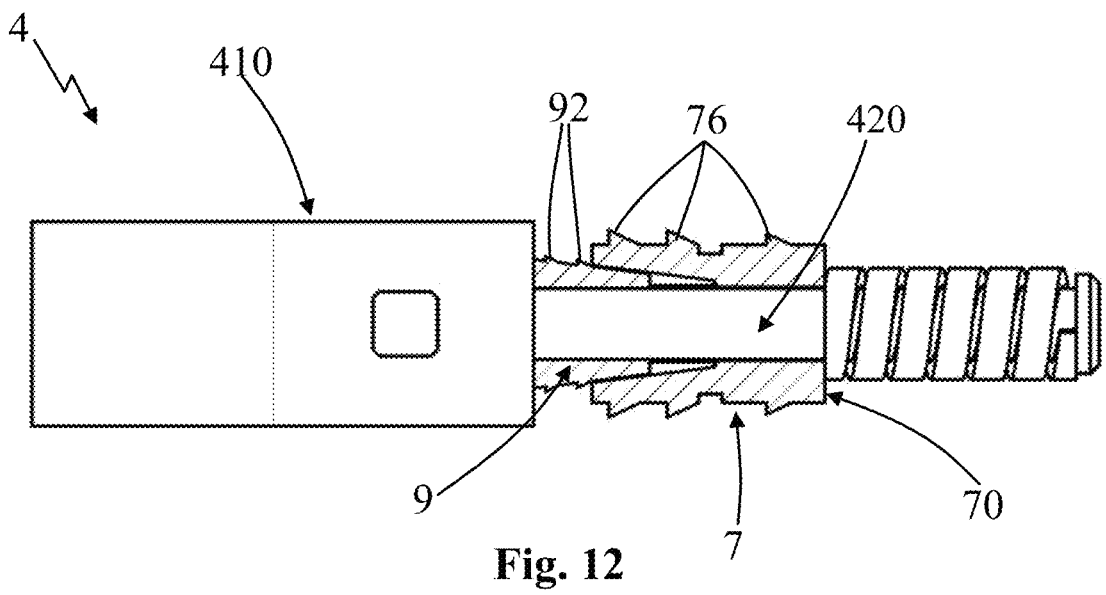
FIG. 12 shows a partially sectional view of the first articulation element of FIG. 11 carried out according to the trace XII-XII of FIG. 11.
Figure 13:
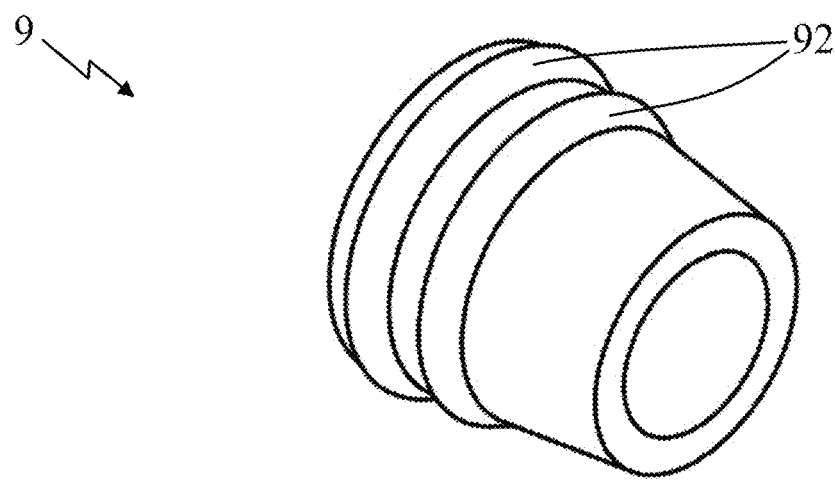
FIG. 13 shows a perspective view of a detail of the elastic hinge according to the present invention in accordance with the second embodiment of FIG. 10 and relative to an expander body.
Figure 14:
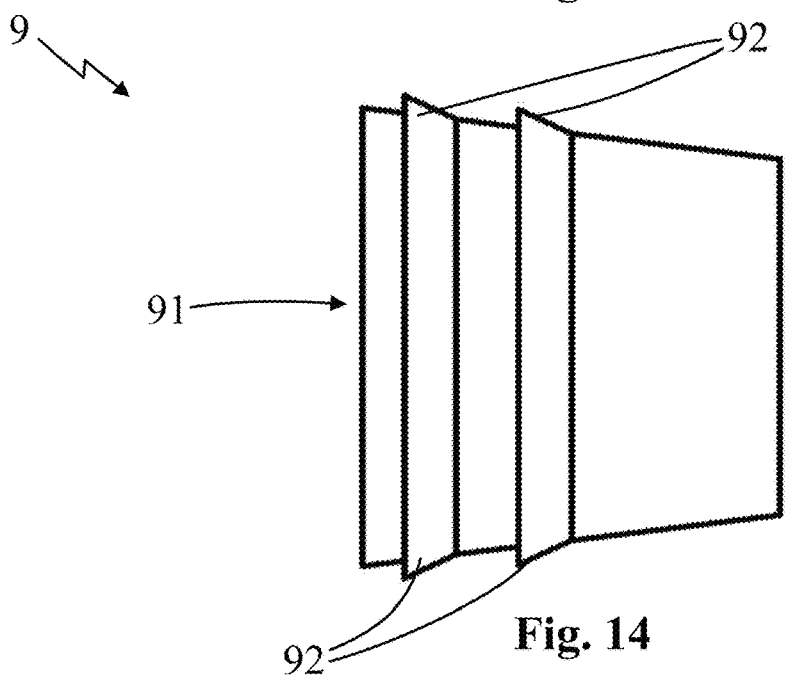
FIG. 14 shows a side view of the expander body of FIG. 13.
Figure 15:
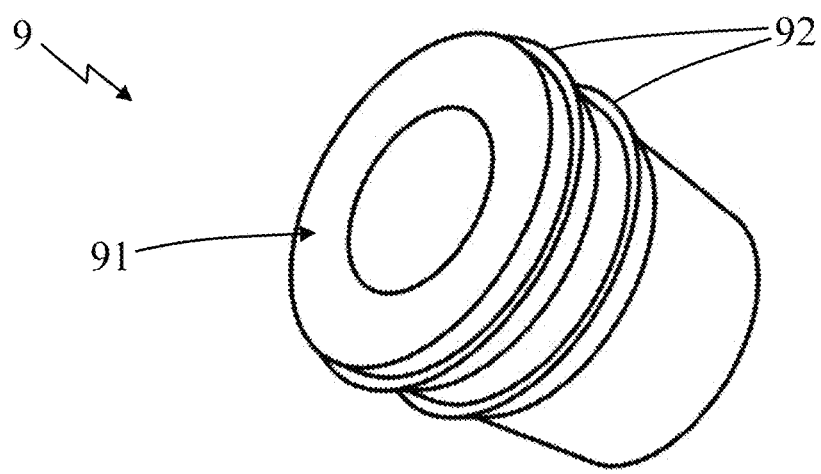
FIG. 15 shows a perspective view of the expander body of FIG. 14.
Figure 19:
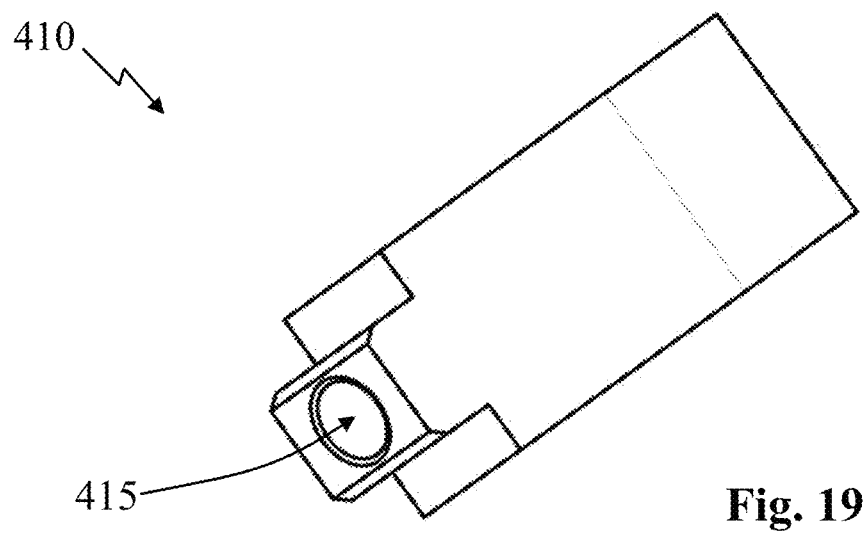
FIG. 19 shows a perspective view of a detail of the third embodiment of the elastic hinge for the plastic frame of eyeglasses according to the present invention, relative to the head portion of a male element of the first articulation element.
Figure 20:
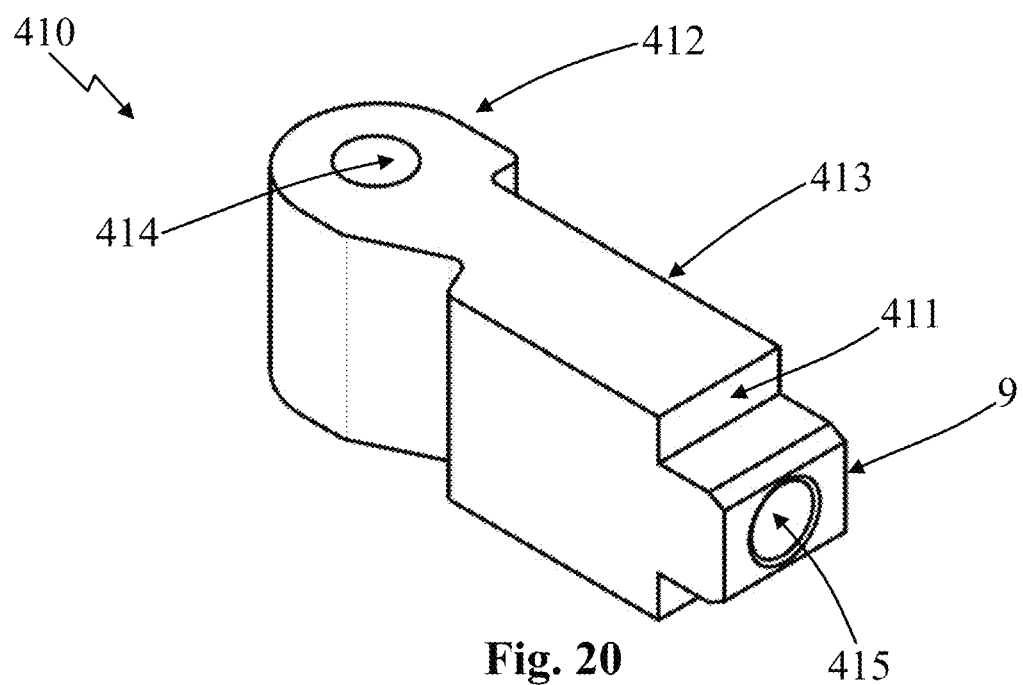
FIG. 20 shows a second perspective view of the head portion of the male element of FIG. 19.
Figure 21:
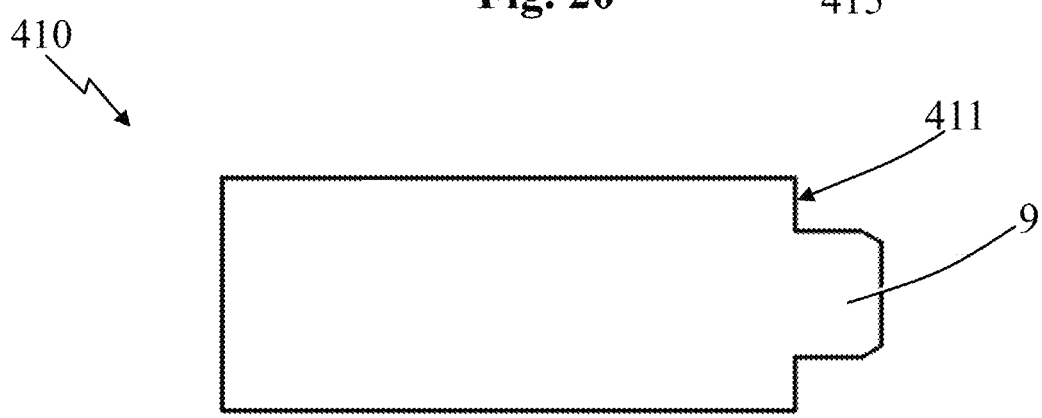
FIG. 21 shows a plan view of the head portion of the male element of FIG. 19.
Figure 24:
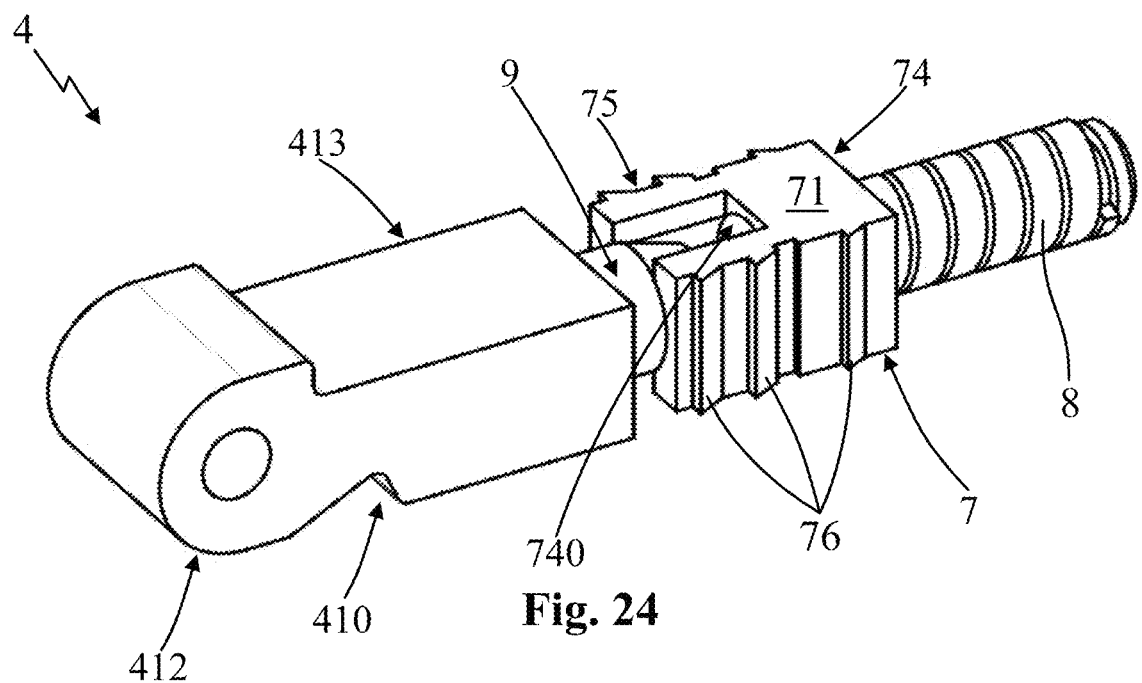
FIG. 24 shows a further perspective view of the first articulation element of FIG. 23.
Figure 25:
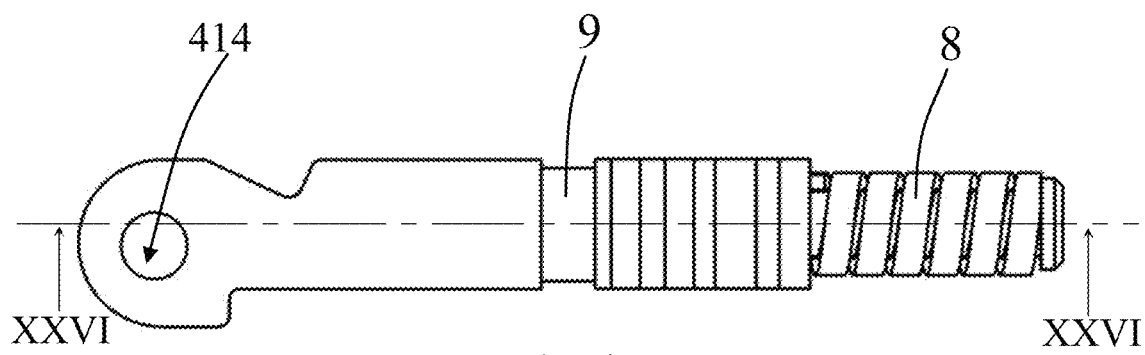
FIG. 25 shows a side view of the first articulation element of FIG. 24.
Figure 26:
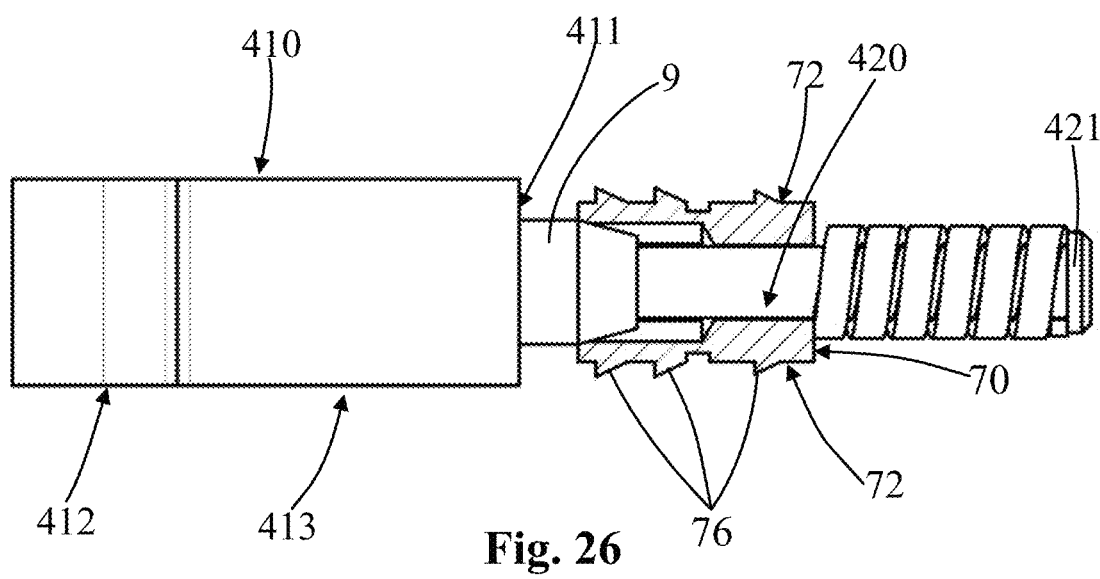
FIG. 26 shows a partially sectional view of the assembly of FIG. 25 according to the trace XXVI-XXVI of FIG. 25.
Figure 27:
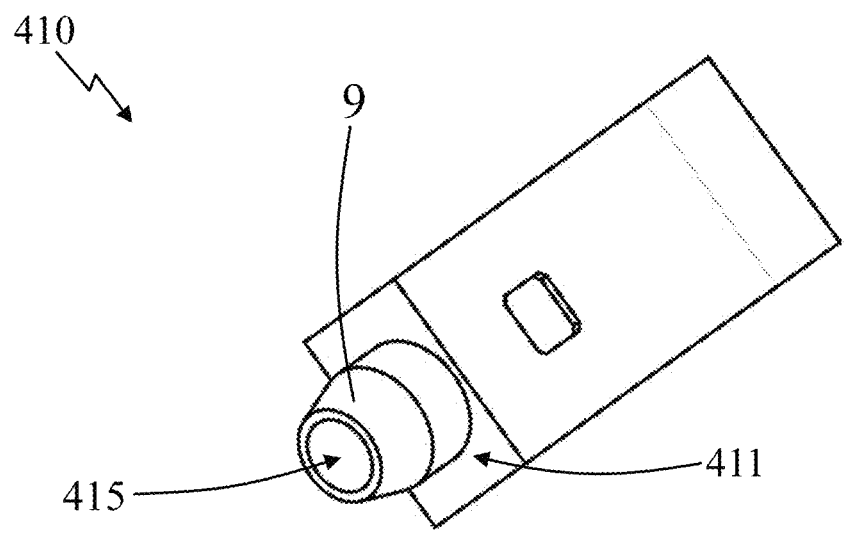
FIG. 27 shows a perspective view of a detail of the fourth embodiment of the elastic hinge for the plastic frame of eyeglasses according to the present invention, relative to the head portion of a male element of the first articulation element.
Figure 28:
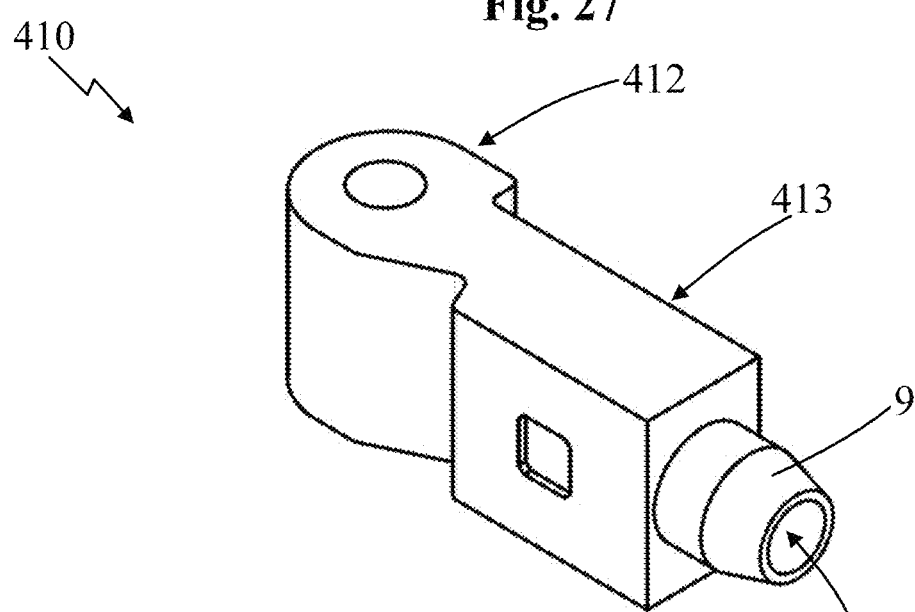
FIG. 28 shows a second perspective view of the head portion of the male element of FIG. 27.
Figure 29:
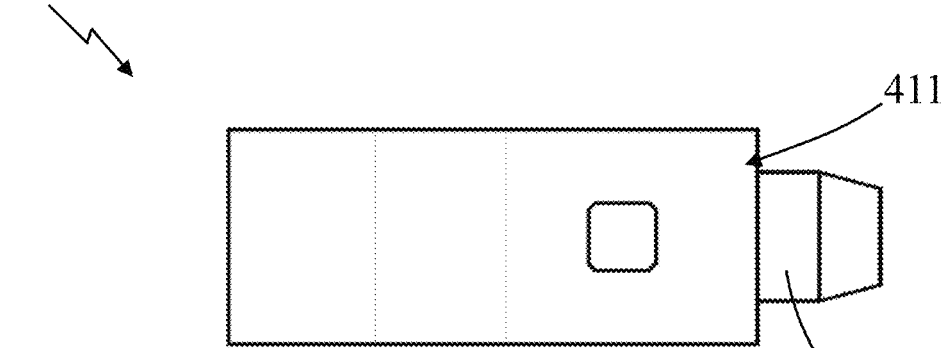
FIG. 29 shows a plan view of the head portion of the male element of FIG. 27.

According to the present invention the aforesaid method provides for a pre-assembly, as shown in the exploded view in FIG. 2, of the first articulation element 4 in which the expander body 9, the anchorage body 7 and the elastic element 8 are slidably mounted around the rod-like portion 420 of the movable male element 40 and the rod-like portion 420 is permanently fixed, as previously described, to the head portion 410 of the male element 40.

Alternatively, in accordance with the embodiment in which the head portion 410 and the rod-like portion 420 of the male element 40 are made of a single body, respectively the expander body 9, the anchorage body 7 and the elastic element 8 are first slidably mounted in the rod-like portion 420 and then the enlarged termination 421 of the rod-like portion 420 is made.

Figure 30:
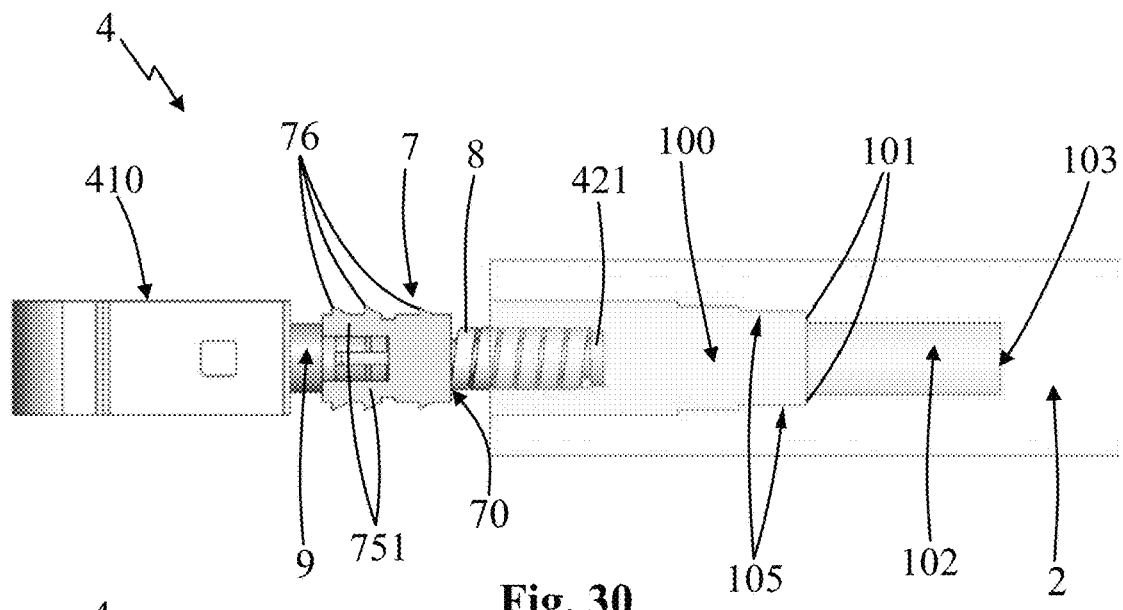
FIGS. 30 and 31 show two successive moments of a step of inserting the first articulation element in the temple, of the method for assembling an elastic hinge to the eyeglass frame according to the present invention, illustrated with some parts transparent in order to better illustrate other parts.
Figure 31:
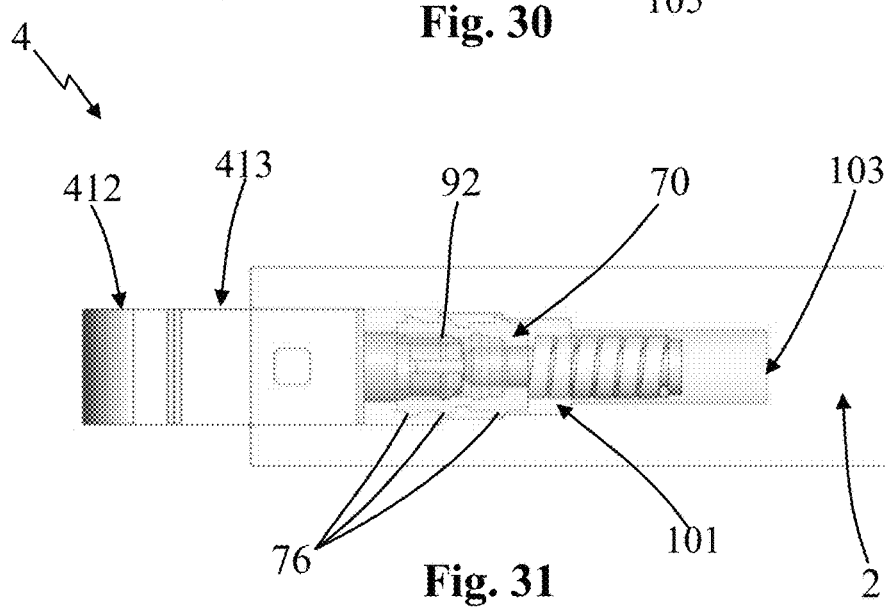
Figure 32:
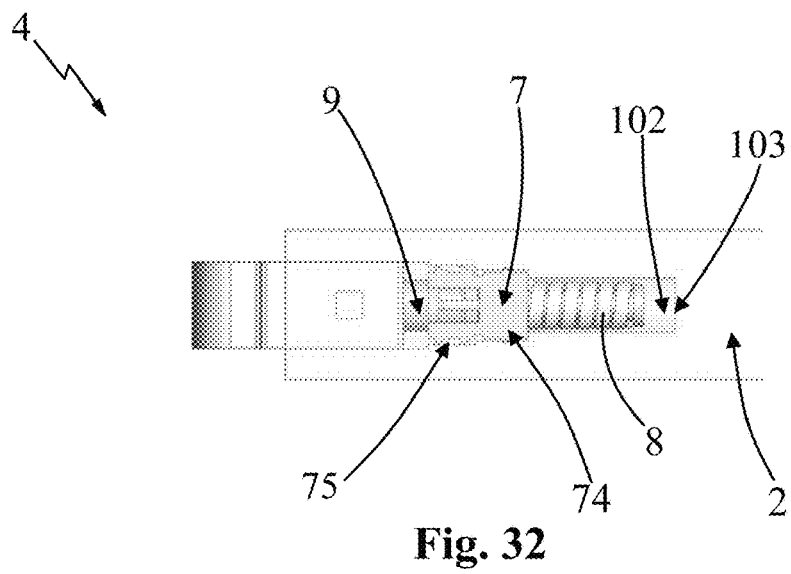
FIG. 32 shows a step in which an anchorage body of the first articulation element abuts against an end stop of a seat made in the temple, in accordance with the method for assembling an elastic hinge to the eyeglass frame according to the present invention, illustrated with some parts transparent in order to better illustrate other parts.
Figure 33:
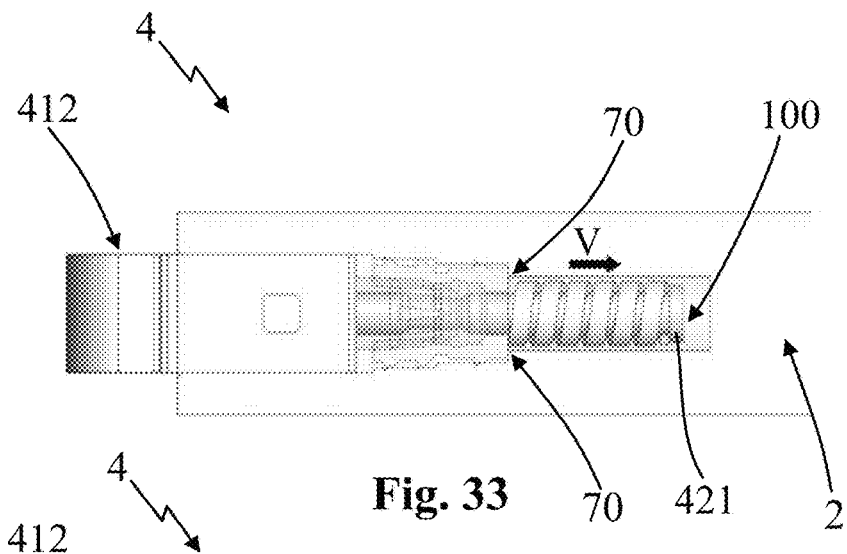
FIGS. 33 and 34 show a step of expanding an anchorage body of the first articulation element, of the method for assembling an elastic hinge to the eyeglass frame according to the present invention, illustrated with some parts transparent in order to better illustrate other parts.

At this point, as shown in FIG. 30, the first articulation element 4 is inserted, according to the insertion sense V shown in FIG. 33, within the seat 100 made in the temple 2 in a provided initial insertion step.

Following the insertion, a step is provided, shown in the enclosed FIG. 33, in which due to the internal shape of the seat 100 there starts to be interference between the anchorage body 7 and the horizontal surfaces 105 of the seat 100. Advantageously, such interference is limited, the seat having dimensions comparable to those of the anchorage body 7; in this manner, during insertion, the internal walls of the seat 100 are not substantially modified and the insertion is particularly easy, not requiring high compressions.

Advantageously the seat 100 is shaped in a manner such to allow the anchorage body 7, in an intermediate step of the method, to abut against suitable end stop elements 101 positioned in a manner such that the insertion operation must be interrupted. For such purpose, the seat 100 provides for a narrowing, beyond which only the insertion of the rod-like portion 420 of the male element 40 can continue.

Such narrowing provides for a transverse size with dimensions comparable with the enlarged termination 421 of the rod-like portion 420 in a manner such that the latter is slidably movable with precision within the seat 100.

At this point, the anchorage body 7 is blocked and therefore the expander body 9 continues its travel in a provided expansion step, towards the interior of the seat 100, penetrating within the retention portion 75 of the anchorage body 7. As it penetrates, as can be seen in FIG. 34, the expander body 9 determines an enlargement (expansion) towards the exterior of the retention portion 75 of the anchorage body 7, due to which the penetration of the anchorage elements 76 into the material constituting the temple 2 of the eyeglasses starts.

Figure 34:
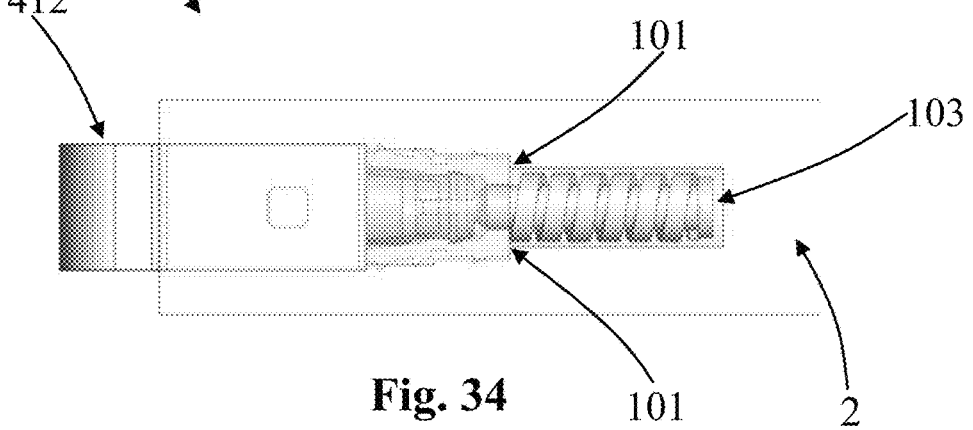
Figure 35:
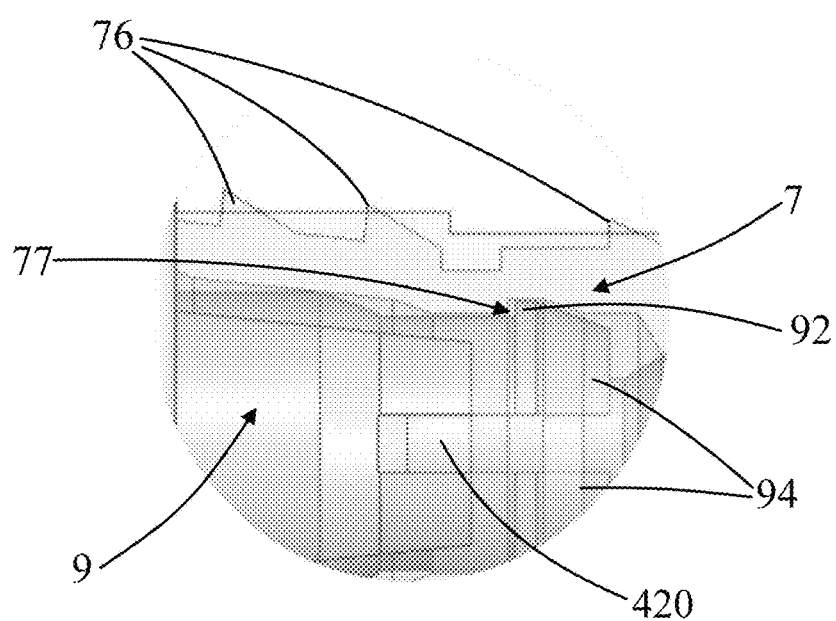
FIG. 35 shows an enlarged detail of FIG. 34.
Figure 36:
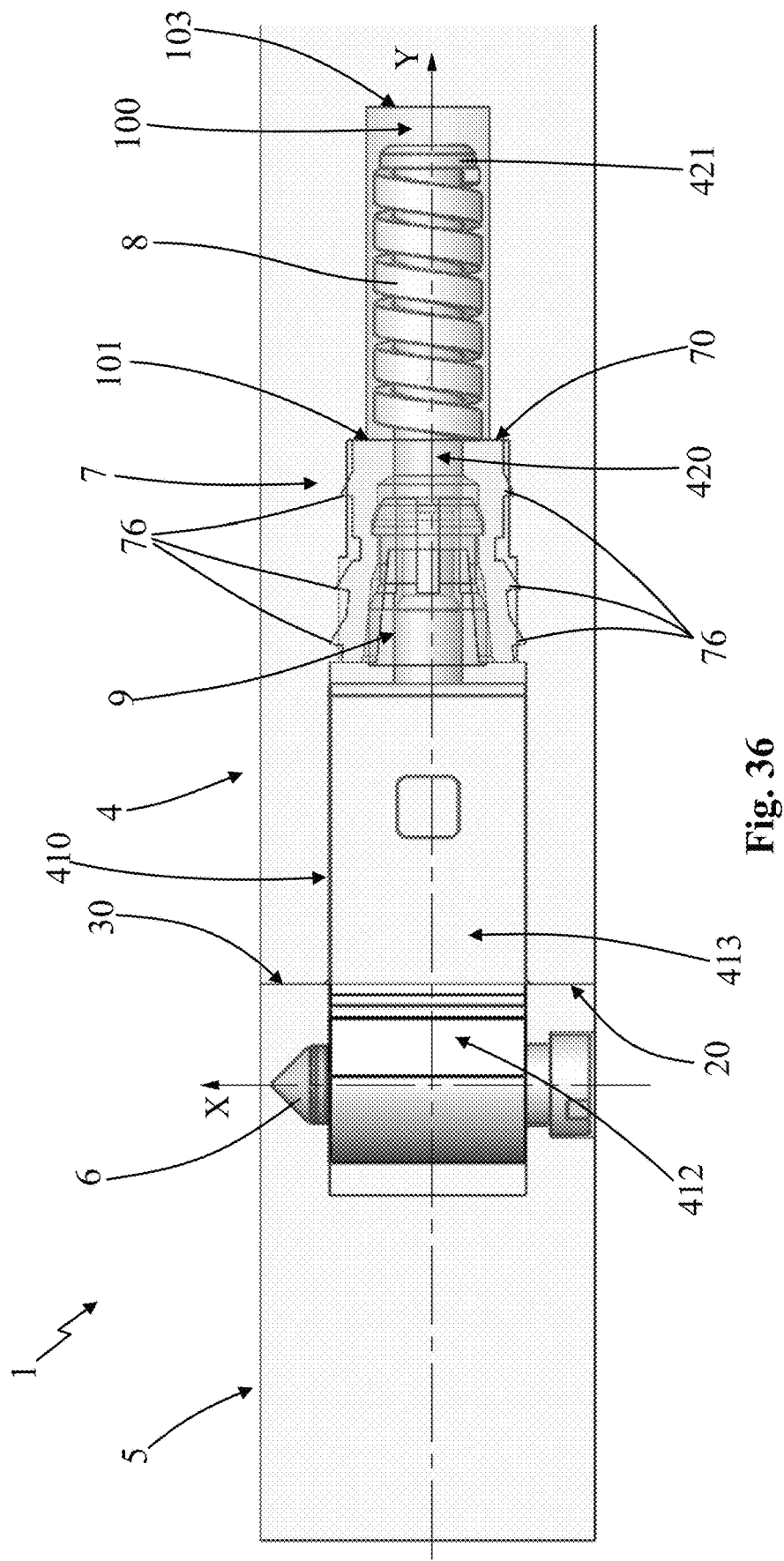
FIG. 36 shows a final step in which the expander body of the first articulation element reaches into the provided operative position in accordance with the method for assembling an elastic hinge to the eyeglass frame according to the present invention, illustrated with some parts transparent in order to better illustrate other parts.

According to the idea underlying the present invention and shown in FIG. 34, the assembly method provides for a final step, in which the retention portion 75 of the anchorage body 7 is completely expanded and the anchorage elements 76 completely penetrated in the temple 2 of the eyeglasses so as to obtain an engagement by means of retention relationship. In addition, in this operative situation, shown in FIG. 35, the head portion 410 of the movable male element 40 is in abutment against the anchorage body 7.

The aforesaid final step can provide for—in the case shown in the enclosed FIGS. 2 to 15, in accordance with the preferred embodiment, in which the expander body 9 is provided with projections 92—step of coupling the expander body 9 on the anchorage body 7. In this manner, an integral and permanent fixing is obtained between these two bodies, visible in the enclosed FIG. 35; thus, the retention portion 75 of the anchorage body 7 is always expanded and the anchorage elements 76 always remain engaged with the temple 2. In this manner, for any position of the temple, e.g. the closed position, open position or over-travel position or any one intermediate position between those mentioned above, the retention portion 75 of the anchorage body 7 always remains expanded, ensuring a secure anchorage to the temple 2 of the eyeglass frame.

Otherwise, in accordance with the embodiments shown in the enclosed FIGS. 16 to 29, in which the head portion 410 of the movable male element 40 and the expander body 9 are attained in a single body, the expander body 9 is not intended to be mechanically connected, by means of retention relationship, to the anchorage body 7 since it must be moved, in relation to the position occupied by the temple 2, together with the movable male element 40.

The method for assembling the elastic hinge 1 to the plastic frame of eyeglasses described up to now allows obtaining a facilitated mounting of the elastic hinge 1 to the frame of the eyeglasses by means of a simple pressing of the elastic hinge 1 within the seat 100 made on the temple 2 of the eyeglass frame.

In addition, the method, object of the present invention, allows obtaining a permanent and secure fixing of the elastic hinge 1 to the frame of the eyeglasses.

The hinge thus conceived therefore attains the pre-established objects and in particular is able to move the temple 2 up to an over-travel position, maintaining the hinge firmly anchored to the frame of the eyeglasses, and simultaneously it is susceptible of being mounted with an extremely easily and inexpensive process.

It is in any case clear that modifications can be made to the elastic hinge described up to now, without departing from the protective scope of the present patent. For example, nothing prevents the articulation element from comprising the elastic device and the anchorage body from being arranged on the end piece of the eyeglasses rather than on the temple.

In addition, all details can be substituted by technically equivalent elements and the shapes, sizes and materials used can be of any type in accordance with the requirements.

The invention claimed is:

1. An elastic hinge for a plastic frame of eyeglasses, said elastic hinge comprising:
    a first articulation element, which is mechanically engageable in a seat made in a first plastic component of eyeglasses and provided with an internal wall,
    a second articulation element intended to be arranged on a second component of said eyeglasses and rotatably coupled to the first articulation element by means of a hinge pin;
    wherein said first articulation element comprises:
        a male element arranged for sliding in the seat of said first plastic component, provided with main extension according to an axis (Y), and provided with:
            a head portion arranged for being at least partially extended outside the seat of said first plastic component, and rotatably coupled by means of said hinge pin (6) to the second articulation element;

a rod-like portion arranged for being inserted inside the seat of said first plastic component and extended from said head portion to an opposite enlarged termination of said rod-like portion;

an anchorage body provided with a guide portion slidably coupled to said rod-like portion;

an elastic element interposed between the enlarged termination of said rod-like portion and said anchorage body;

wherein said anchorage body also comprises a retention portion, which is projectingly extended from said guide portion towards the head portion of said male element and is provided with anchorage elements for being engaged by means of retention relationship to the internal wall of the seat of said first plastic component;

wherein said first articulation element also comprises an expander body interposed between the head portion of said male element and said anchorage body and slidably arranged along said rod-like portion from at least one non-operative position (A), in which said expander body does not interfere with said anchorage body, to an operative position (B), in which said expander body interferes with the retention portion of said anchorage body and expands said retention portion externally towards the internal wall of said seat in order to engage the anchorage elements of the retention body of said anchorage body with said first plastic component;

wherein the retention portion of said anchorage body is provided with an internal surface directed towards said axis (Y); wherein said expander element in said operative position (B) acts in radial thrust against said internal surface, pushing said retention portion away from said axis (Y) in order to press the anchorage elements of said retention portion against the internal wall of said seat.

2. The elastic hinge according to claim 1, wherein the retention portion of said anchorage body comprises at least two first flexible wings having said anchorage elements externally associated therewith.

3. The elastic hinge according to claim 1, wherein said expander body is in a single body with the head portion of the male element of said first articulation element.

4. The elastic hinge according to claim 3, wherein said expander body is provided with a central through hole and comprises at least one final portion of substantially frustoconical shape.

5. The elastic hinge according to claim 3, wherein said expander body is projectingly extended from the head portion of said male element towards the enlarged termination of said rod-like portion with a parallelepiped shape provided with an axial through hole traversed by the rod-like portion of said male element.

6. The elastic hinge according to claim 3, wherein said expander body is projectingly extended from the head portion of said male element towards the enlarged termination of said rod-like portion with at least one frustoconical portion having tapering towards the enlarged termination of said rod-like portion; said expander body being provided with an axial through hole traversed by the rod-like portion of said male element.

7. The elastic hinge according to claim 1, wherein said expander body is an element separated from the head portion of said male element.

8. The elastic hinge according to claim 7, wherein said expander body comprises:
an annular body facing the head portion of the male element of said first articulation element, and
two or more second flexible wings, each projectingly extended from said annular body in opposite direction with respect to said head portion;

said second flexible wings being provided with free ends with coupling teeth intended to be engaged by means of shape coupling in a shoulder of said anchorage body, with said expander body arranged in said operative position (B).

9. The elastic hinge according to claim 8, wherein the rod-like portion of said male element has an intermediate depression receiving the free ends of said second flexible wings, with said expander body arranged in an intermediate position between said non-operative position (A) and said operative position (B).

10. The elastic hinge according to claim 9, wherein the rod-like portion of said male element, in a section subsequent to said intermediate depression towards said enlarged termination, interferes with the second flexible wings of said expander body, enlarging said second flexible wings in engagement in said shoulder of said anchorage body with said expander body arranged in said operative position (B).

11. A method for assembling the elastic hinge according to claim 1 with a plastic frame for eyeglasses, and such method comprises:
a step of inserting the male element of said first articulation element inside said seat;
an intermediate step, in which said anchorage body abuts against an end stop of said seat;
an expansion step, in which said expander body is moved along the rod-like portion of said male element between said non-operative position (A) and said operative position (B), being progressively coupled in the retention portion of said anchorage body, causing an outward expansion of said retention portion;
a final step, in which said expander body has attained the operative position (B) and the retention portion of said anchorage body is expanded with the anchorage elements penetrated into said first plastic component and engaged in retention relationship with the internal wall of said seat.

\* \* \* \* \*